Figure 5:
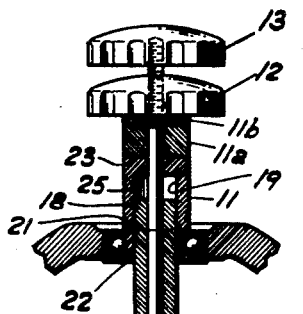

June 30, 1953 C. H. FLANIGAN 2,643,502
POWER LAWN MOWER OF THE ROTATING CUTTING DISK TYPE
Filed July 5, 1949 2 Sheets-Sheet 1
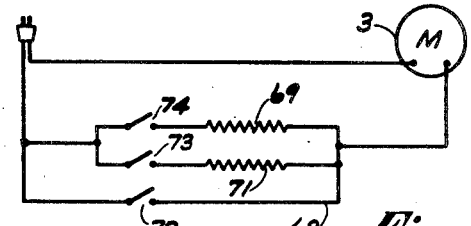
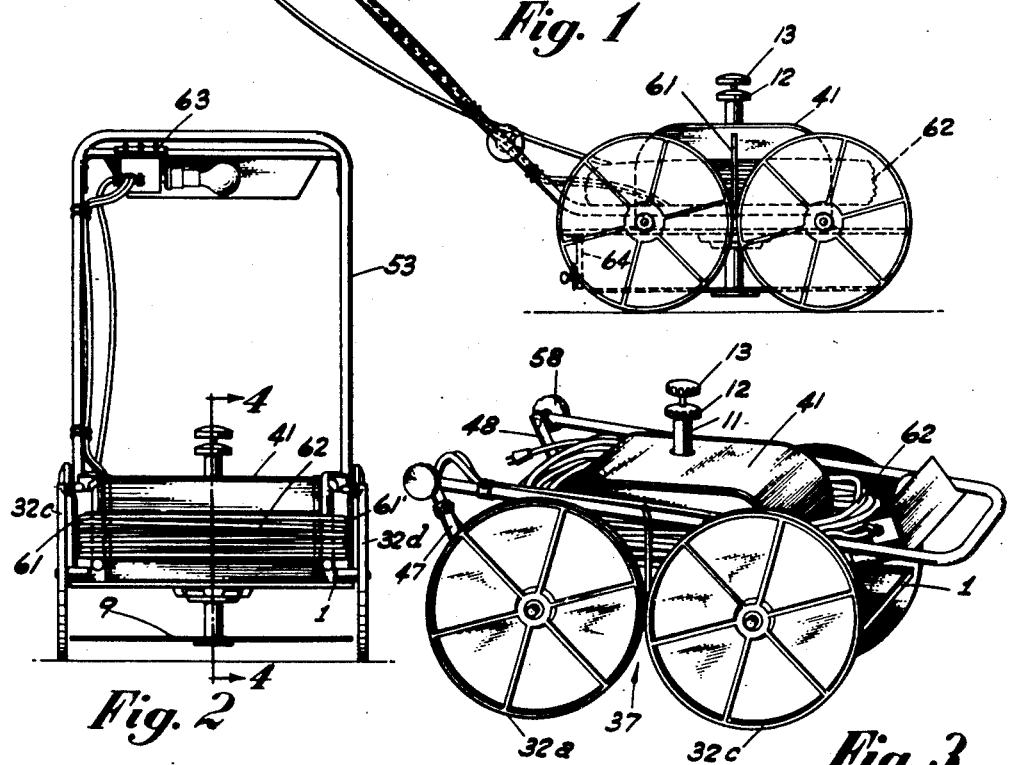
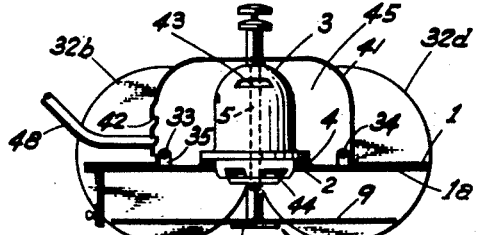
INVENTOR.
CLIFFORD H. FLANIGAN
BY Arthur Robert
ATTORNEY June 30, 1953 C. H. FLANIGAN 2,643,502
POWER LAWN MOWER OF THE ROTATING CUTTING DISK TYPE
Filed July 5, 1949 2 Sheets-Sheet 2

INVENTOR.
CLIFFORD H. FLANIGAN
BY Arthur Robert
ATTORNEY

UNITED STATES PATENT OFFICE 2,643,502

POWER LAWN MOWER OF THE ROTATING CUTTING DISK TYPE

Clifford H. Flanigan, New Albany, Ind.

Application July 5, 1949, Serial No. 103,145

3 Claims. (Cl. 56—25.4)

The present invention relates to a power lawn mower of the type which carry a cutter rotatable on a vertical axis.

It is an object of the present invention to provide a power mower in which the cutter is protected at its sides against accidental contact with the operator.

Another object is the provision of a cutter guard for the rear end of the mower.

Another object is the provision of a power mower in which the cutter is protected from striking the ground or obstructions on the ground.

Another object is the provision of an elevation adjustment for the cutter in combination with an automatic release for the cutter in the event the cutter engages an unyielding object.

Another object is the provision of a cutter which will not tend to deflect up or down in cutting, and is not easily bent or broken.

Another object is the provision of a mower which is easily cleaned and in which the motor is protected from accumulating deposits of cuttings or other debris.

Another object is the provision of an electric mower having a convenient arrangement for storing the electric cable and letting out the cable as required.

Another object is the provision of a mower which can be folded to a compact size and can be stored in a small space.

Another object is the provision of a convenient electric control for varying the speed of the motor.

In a practical embodiment of the invention the cutter blade extends substantially to, and preferably beyond the vertical planes passing through the wheel axles. This causes the blade to elevate or depress substantially simultaneously with the centers of the wheels in passing over uneven ground or obstructions, and the rising or depressing of the blade is not substantially less than the rising or depressing of the wheel axles under such conditions. This reduces the possibility of the blade striking an obstruction or the sides of a depression over which a wheel passes, and prevents scalping the ground as the wheels pass over a depression. The wheels preferably are brought as close together as is practical without contacting each other. Under such an arrangement, the maximum permissible length of the blade is about double the chord formed by the blade where its projection intersects the wheel periphery, plus the distance between the wheel pripheries measured in the plane of the blade. This maximum length will depend on the distance of the blade from the ground. However, by determining the blade length at its minimum distance from the ground its length will lie within the maximum limitation at any other elevation of the blade. If the blade is made substantially smaller than this maximum the danger of the blade hitting an obstruction or scalping the soil decreases. By employing disc wheels they may serve as a guard at the sides of the mower, because the blade is exposed only between the wheels.

Th cutter blade preferably is clamped between the lower end of the motor shaft and the clamping plate carried by a rod or shaft extending through the hollow motor shaft, and held in position by a hand wheel threaded on the upper end of the rod. Spacers are interposed between the blade and the lower end of the motor shaft to adjust the elevation of the blade from the ground. Spacers also may be provided between the upper end of the motor shaft and the hand wheel. The spacer at the upper end of the shaft has a greater frictional engagement with the motor shaft than does the bottom spacer, and the hand wheel screws off in the direction of rotation of the motor shaft. Thus, should the blade strike an obstruction the upper collar will tend to rotate with the motor shaft and thus screw the hand wheel upward to release the clamping grip between the knife blade and motor shaft. This frees the knife so that it will not turn with the motor to prevent breakage or bending of the knife. The upper and lower spacers are made of different lengths and are interchangeable to provide an adjustment of the elevation of the cutter blade.

The cutter is constructed of flexible tool steel or other suitable metal, and preferably is bevelled on both faces to form a cutting edge. This equalizes vertically acting forces on the blade in cutting and minimizes bending of the blade in operation. Thus, if the blade strikes an obstruction, it will not tend to cut spirally, and thus will not tend to bend.

By having a planar bottom surface for the carriage carrying the motor and blade, the tendency of cuttings to adhere to the bottom is minimized. Also, the wheels are made solid and planar on their inner surfaces for the same purposes, and additionally, the solid or disc construction of the wheel provides a safeguard to prevent the operator accidentally contacting the blade at the sides of the carriage. Or, if desired, the wheels may overlap, so as to reduce the tricusp space formed thereby with the ground, thus further reducing the danger of contacting the cutter from the sides. This, of course, may require a reduction in length of the cutter blade, or an increase in wheel diameter, in order to maintain the preferred ratio of blade length to wheel diameter.

A backguard is provided in the form of a suspended plate below the carriage, preferably arranged so as to engage the back wheels to limit forward swinging movement thereof. The guard is weighted so that in normal working position the guard does not engage the wheels. However, should the mower be moved backward, the engagement of the back guard plate with the grass is sufficient to cause the guard plate to swing forward against the rear wheels, and the scraping sound caused thereby serves as a reminder to the operator not to move the mower backward. The depending back gate also serves to distribute and spread the cuttings more evenly as it drags along the cut grass in forward movement. A spare blade may be attached to the back guard to serve as a weight and suspend the guard in plomb position out of engagement from the wheels.

The motor is cooled by air drawn in the top end discharged at the bottom adjacent the cutter. The motor is surrounded by an apertured hood offering restricted access of air to the interior so that the air, which may carry cuttings, enters the openings in high velocity streams, whereupon the air velocity in the hood is reduced and entrained particles settle out so they are not carried into the motor. The openings in the hood may be louvered, if desired, to prevent entrance of rain, etc.

Figure 6:
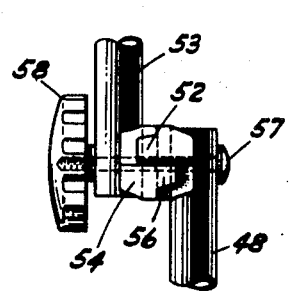
Figure 7:
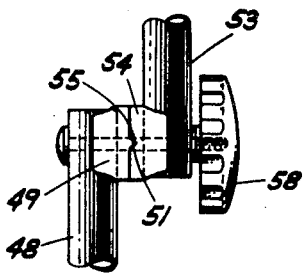
Figure 8:
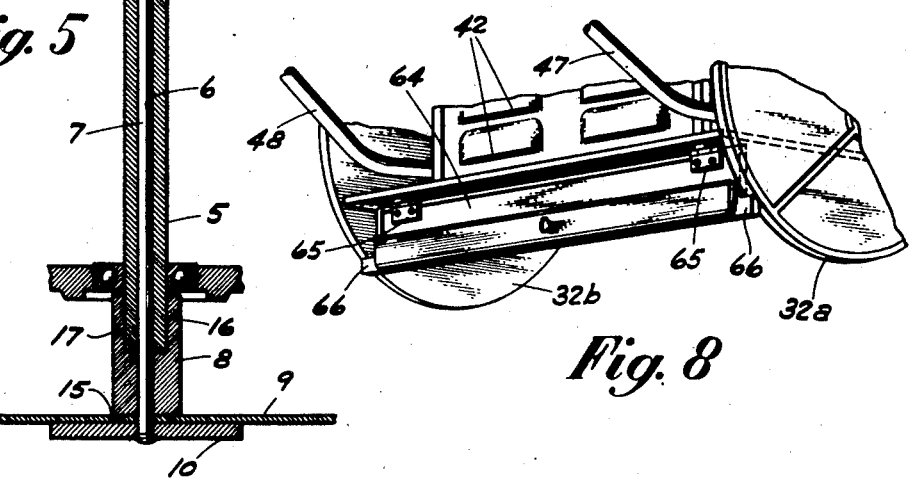
Figure 9:
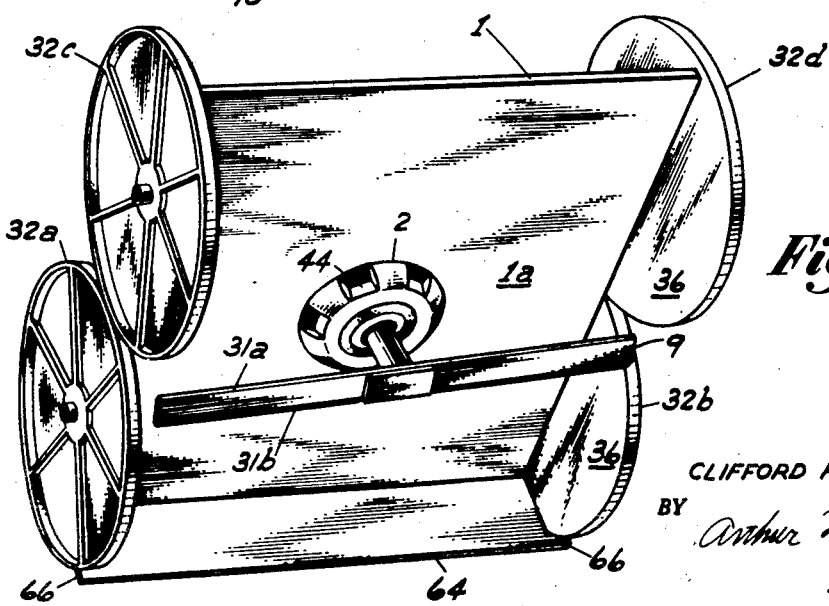

The invention will be described in greater detail in connection with the accompanying drawings illustrating a preferred embodiment of the invention by way of example, and wherein:

Figure 1 is a side elevation of the invention;
Figure 2 is a front elevation;
Figure 3 is an enlarged perspective side view showing the handle folded;
Figure 4 is an enlarged sectional view taken on line 4—4 of Figure 2;
Figure 5 is a fragmentary sectional view showing the cutter mounting;
Figures 6 and 7 show enlarged details of the handle mounting;
Figure 8 is an enlarged perspective view showing the rear guard;
Figure 9 is an enlarged bottom perspective view of the mower; and
Figure 10 is an electrical diagram of the motor speed control.

Referring to the drawing (Figure 4) the chassis of the mower consists of a plate 1, the bottom 1a of which is flat or planar, and a central hole 2 is provided in the plate for reception of the motor 3. The hole 2 is surrounded by a rib 4 to which the motor casing is secured with the motor shaft 5 extending through the hole a suitable distance. The motor shaft has a longitudinal bore 6 (Figure 5). A cutter shaft or rod 7 extends through this bore and through a spacing collar 8 and the cutter blade 9, a clamping plate 10 being secured on the lower end of the rod. In assembled relation the upper end of the cutter shaft receives the collar 11 engaging against the motor shaft, the spacer collars 11a and 11b, the whole assembly being clamped on the motor shaft by a hand screw 12. The threads on the rod 7 advance in the opposite direction to the motor rotation, so that rotation of knob 12 in the direction of motor rotation tends to unscrew or raise the knob when the rods are not rotating at the same speed as the motor. A retaining knob 13 is threaded on the end of the cutter rod to prevent the hand screw 12 coming off the rod.

It will be noted that plate 10 is relatively large so as to have a large surface in frictional engagement with the cutter blade, while collar 8 is relatively small, so as to have a smaller surface 15 in engagement with the blade. Also, by providing a counterbore 16 in the collar 8 of less depth than the projecting lower end of motor shaft 5, the end of the motor shaft abuts the bottom 17 of the counterbore. The stub 18 of the motor shaft at the top may be of slightly reduced diameter and is received in the counterbore 19 of the collar 11 so as to allow the end face 21 of the collar to bear against the ferrule 22 of the ball bearing assembly. This ferrule is secured to and rotates with the shaft 5, and in effect provides a shoulder for the shaft. The knob 12 engages collar 11b and in effect bears against the face 23 of collar 11 and draws the cutter shaft upward so as to clamp the knife between the plate 10 and collar 8; clamp the motor shaft between collars 8 and 11; and clamp the knob 12 against the collar 11.

The annular surface of engagement 21 between collar 11 and the motor shaft has a greater radius than the annular surface of engagement 17 between collar 8 and the motor shaft, and, thus presents a greater area of contact. Hence, any slippage that may be induced will occur at surface 17. Thus, if the blade strikes a rigid object, such as a stone, the blade 9 will be retarded and the motor shaft will continue to turn and slippage will occur at surface 17. The retarded action of the blade is transmitted through plate 10 to rod 7, and as nut 12 tends to rotate at the motor speed because of its frictional contact through spacers 11, 11a, 11b, the relative motion between rod 7 and nut 12 unscrews the rod 7, thereby releasing the clamping action on the blade to allow the motor to continue to turn without driving the blade. Nut 13 acts as a stop to prevent the rod 7 unscrewing entirely through nut 12. To resecure the blade, it is only necessary to stop the motor, hold the cutter blade, and screw down the hand screw 12.

The collars 8 and 11, 11a and 11b also provide an adjustment of the elevation of the cutter blade. The position of the blade is determined by the distance between the bottom 17 of the counterbore, and the surface or end 15 of the collar 8. In collar 11, the distance between the bottom 25 of the counterbore and end surface 23 is less than the corresponding distance in collar 8. The overall length of collar 8 is equal to the overall length of collar 11, plus collars 11a and 11b. Thus, by interchanging and inverting collars 8 and 11 an adjustment in elevation of the cutter blade is secured. An additional range of adjustment may be obtained by transferring collar 11a or 11b, or both, to the bottom between collar 8 and the knife blade, or between collar 11 (when collar 11 is at the bottom) and the knife blade. For example, assuming a distance of 1 1/16 inch between surface 15 and 17, and that washer 11a is 1/2 inch and washer 11b is 1/4 inch high, the maximum distance of the blade from the shaft end will be 1 13/16 inch. If on collar 11 the distance between faces 23 and 25 is 1/16 inch, the possible combinations obtainable are 1/16, 5/16, 11/16, 1 1/16, 1 5/16, 1 7/16, 1 11/16 and 2 1/16. Other distances may be obtained by the use of additional spacing, collars, or by replacing washers 11a and 11b by thinner washers of the same aggregate thicknesses.

Each edge of the cutter blade is bevelled as indicated at 31a and 31b so that in cutting there is no tendency for the blade to deflect either up or down, but the blade drives straight through any solid object it may encounter. This reduces or eliminates bending of the blade. As both edges of the blade are sharpened, either edge may be employed as the leading or cutting edge.

The wheels 32a, b, c and d are mounted in roller bearings journalled on shafts 33 and 34 which pass through boss 35 on the plate 1. These wheels preferably are solid or disc type and have flat or planar inner surfaces 36 to reduce adhesion of cuttings thereto. The distance between shafts 35 and 34, the diameter of the wheels, and the effective radius of the cutter are selected so that when the cutter is in its lowermost position as shown in Figure 4, its length is not greater than double the chord formed where the plane of the cutter intersects a wheel, plus the distance between the wheel edges in that plane. The wheels thus provide an effective guard for the cutter to prevent injury to the operator, because the cutter is exposed only at the tricusp space 37 between the wheels.

The cutter does not project beyond the wheel peripheries, so that should the mower be tilted there is no danger of the blade striking the ground. Furthermore, as the extreme end of the cutter lies beyond the vertical diameter of the wheel, the cutter must elevate when the wheel rides over an obstruction, so that in going over uneven ground the blade is not likely to strike any obstruction ridden over by the wheel. By providing four wheels the mower is stabilized as the cutting plane is determined by any three of the wheels. Thus, if one wheel rides over a depression the other three wheels continue to support the mower in a common plane. The large diameter wheels also provide for smoother cutting as they do not enter small depressions. By having the wheels thin trimming of grass close to walls or walks can be done while still maintaining the benefit of the wheel guards. The axle length between wheels is selected to allow the cutter to rotate between the wheels.

The motor casing is covered by a hood 41 of sheet metal suitably fastened to the bottom plate 1, and which has downwardly sloping louvres 42 for the admission of air. A fan (not shown) in the casing of motor 3 draws air from the openings 43 in the casing and discharges the air through suitable openings 44 at the bottom of the motor casing under the plate 1. The air enters the hood 41 through the louvres 42 at a relatively high velocity and in the quiescent chamber 45 any entrained particles of grass drop out, so that relatively clean air passes through the motor. This substantially eliminates the deposit of foreign entrained matter in the motor.

A pair of tubular bars 47 and 48 are secured to the bosses 34, 35 on the bottom plate and are turned up at their ends. Each bar carries a swivel plate 49 which straddles the bar and plate 49 has a radial rib 51 and a stop finger 52 thereon. A U-shaped handle 53 carries swivel plates 54 at its ends, each plate having a radial groove 55 and a stop finger 56. The plates are held together by bolts 57 passing through the bars and plates, and handwheels 58 threaded on the ends of the bolts clamp the handle 53 in operative position. To fold the handle the handwheels are released to allow the ribs 51 to spring out of grooves 55.

A pairs of rods 61, 61' project upwardly from the base plate 1 between the housing 41 and the wheels. The electrical cable 62 may be wound around the housing 41 between the housing and rods 61, 61', so that the rods protect the cable from being scraped by the wheels. The coil of the cable is wound from the motor toward the free end, and by lifting the coil from the machine and laying it on the ground in inverted position, the cable can unwind as the machine is advanced. This eliminates interference with the cable in operating the machine. When the handle is folded forward, it rests on the cable between the guides 61 and 61' and provides a compact unit for storage. The control panel 63 on the handle carries a light to enable the machine to be operated at night, and carries control switches to start and stop the motor and regulate its speed.

A tail or rear guard plate 64 is hinged at 65 to the underside of the base 1. This plate lies within the peripheries of the side wheels and has extensions 66 which project into the path of the wheels. The gate is of such length that it extends adjacent the plane of the cutter and thus prevents the operator from getting its foot under the machine. The hinged construction allows the gate to slide forward over the grass and distribute or spread the cuttings. It also allows the gate to ride over obstructions. In operation the machine should not be drawn toward the operator. Should the machine be drawn toward the operator, the engagement of the grass against the gate presses the fingers 66 against the wheel edges to produce a scraping or grating sound, and thus warn the operator against moving the mower in this direction. If desired, the spare blade may be attached to the tail gate and secured thereon by a thumb screw.

The motor 3 preferably is of the series wound type and has a direct connection 68, and two resistances 69 and 71 in shunt therewith. These resistances may be of equal or unequal value. Switches 72, 73 and 74 are provided in the direct circuit path and in each resistance circuit path. In operating the machine at low speed, switches 73 and 72 remain open and switch 74 is closed. For intermediate speed, switch 73 also is closed thus providing a path of lower resistance composed of resistances 69 and 71 in parallel. For high speed, switch 72 also is closed to provide a direct path through line 68 and a resistance path through parallel resistances 69, 71.

The operation of the invention now will be described. For operation, the handle is unfolded and secured in this position, the coil of wire is unwrapped sufficient to insert the plug into an outlet, then the coil of wire is removed from the machine and is laid upside down on the ground. The control switch is operated to start the motor, and the machine is advanced by grasping the handle and pushing forward. The rotating knife cuts off grass and weeds, and because of its high speed, pulverizes the cuttings to form a mulch. Tall weeds are bent over by the front of the carriage, and are cut off and disintegrated by the cutter. The relatively large base and four wheels provide a stable operating plane, so that if one wheel passes over a depression the other three wheels provide a plane of support for the machine. Should the front wheels pass over a rise in the ground, or over an obstruction, the cutter is lifted with the wheels and thus clears the obstruction. The arrangement and proportioning of the cutter blade and wheels enables the machine to ride down one side of a ditch and up the other side without scalping the grass at the crest of the ditch. In event the cutter blade does strike the ground, or strikes an obstruction, it tends to cut in without deflection up or down, because the blade is sharpened by a taper on both sides. However, in such case the blade is released by turning of the knob 12 with the motor shaft, to prevent breakage or bending of the blade.

The operator is protected from accidental engagement with the cutter by the rear guard 64 and disc wheels at the sides. As the wheels are almost in peripheral engagement a very small unprotected tricusp space is provided between them. Because of the planar surfaces of the base 1 and wheels, the adherence of cuttings thereto is a minimum. The underside of the machine can be easily cleaned by removing the spare blade and scraping off the underside of the base and inside of the wheels therewith. The cable is readily rewound about the motor hood after use so that the cable can be unwound as above described when the machine is again put to use.

I claim as my invention:

1. A power mower having a vertical hollow motor drive shaft; a knife rod extending through the shaft and having a clamping plate at the end thereof; a perforate knife on said rod; a spacer on said rod engaging the knife and the lower end of the motor shaft, a spacer on the upper end of the motor shaft engaging a larger diameter on the shaft and having a nut engaging surface, and a clamping nut threaded on said rod and abutting said nut engaging surface.

2. A mounting for a cutter as specified in claim 1 wherein said spacers are of unequal length and are interchangeable to provide an adjustable elevation for said blade.

3. A mounting for a cutter as specified in claim 1 wherein said spacers have sockets for receiving the ends of the motor shaft, and the end wall thickness and lengths of the sockets are such that the spacer end bears on a flange of the motor shaft at the top position and the socket bottom bears on the motor shaft end in the bottom position.

CLIFFORD H. FLANIGAN.

References Cited in the file of this patent
UNITED STATES PATENTS

| Number | Name | Date |
| --- | --- | --- |
| 984,327 | Wald | Feb. 14, 1911 |
| 1,805,927 | Sharp | May 19, 1931 |
| 1,954,579 | Smith | Apr. 10, 1934 |
| 2,017,524 | Bolens | Oct. 15, 1935 |
| 2,062,820 | Pierce | Dec. 1, 1936 |
| 2,134,609 | Hay | Oct. 25, 1938 |
| 2,167,222 | Shelor | July 25, 1939 |
| 2,200,799 | Miller | May 14, 1940 |
| 2,232,671 | Loder | Feb. 18, 1941 |
| 2,245,821 | Poynter | June 17, 1941 |
| 2,265,545 | Phelps | Dec. 9, 1941 |
| 2,403,236 | Phelps | July 2, 1946 |
| 2,417,613 | Radabaugh | Mar. 18, 1947 |
| 2,480,922 | Harshman | Sept. 6, 1949 |
| 2,521,972 | Haglund | Sept. 12, 1950 |
| 2,552,951 | Freeman | May 15, 1951 |